(12) United States Patent
Nakamura et al.

(10) Patent No.: US 10,190,864 B2
(45) Date of Patent: Jan. 29, 2019

(54) MULTIPOINT-MEASUREMENT STRAIN SENSOR AND METHOD FOR PRODUCING THE SAME

(71) Applicant: NISSHA CO., LTD., Kyoto (JP)

(72) Inventors: Kazuto Nakamura, Kyoto (JP); Yoshihiro Sakata, Kyoto (JP); Eiji Kawashima, Kyoto (JP); Rokusuke Takemura, Kyoto (JP); Koji Okamoto, Kyoto (JP); Hiroyuki Nagai, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 15/759,861

(22) PCT Filed: Oct. 14, 2016

(86) PCT No.: PCT/JP2016/080555
§ 371 (c)(1),
(2) Date: Mar. 14, 2018

(87) PCT Pub. No.: WO2017/094365
PCT Pub. Date: Jun. 8, 2017

(65) Prior Publication Data
US 2018/0259315 A1    Sep. 13, 2018

(30) Foreign Application Priority Data
Dec. 1, 2015    (JP) .................. 2015-234431

(51) Int. Cl.
*G01B 7/00*    (2006.01)
*G01B 7/16*    (2006.01)

(52) U.S. Cl.
CPC .............. *G01B 7/18* (2013.01); *G01B 7/16* (2013.01)

(58) Field of Classification Search
CPC ............ G01L 5/161; G01B 7/18; G05G 2009/04762; G06F 3/0338
(Continued)

(56) References Cited

U.S. PATENT DOCUMENTS

| | | | |
|---|---|---|---|
| 6,993,982 B2 * | 2/2006 | Karasawa | G01L 5/161 73/862.629 |
| 7,055,365 B2 * | 6/2006 | Yanagi | B60N 2/002 177/211 |

(Continued)

FOREIGN PATENT DOCUMENTS

| | | |
|---|---|---|
| JP | S57201908 U | 12/1982 |
| JP | S61097737 U | 6/1986 |

(Continued)

OTHER PUBLICATIONS

International Search Report dated Jan. 17, 2017 filed in PCT/JP2016/080555.

(Continued)

*Primary Examiner* — Max Noori
(74) *Attorney, Agent, or Firm* — Rankin, Hill & Clark LLP

(57) ABSTRACT

A multipoint-measurement strain sensor which is free of a conduction failure originated from slippage at the time of lamination and which can reduce the material cost, and a method for producing the multipoint-measurement strain sensor are provided. A multipoint-measurement strain sensor 31 of the present invention includes a substrate film 34, a plurality of strain-sensing parts 33 formed on a first main surface 34a of the substrate film 34, routing circuits 37, 38 formed, in correspondence with the respective strain-sensing parts 33, on a second main surface 34b of the substrate film 34, and having outer connection terminals 37b, 38b near an outer edge of the substrate film 34, and a conductive paste 41, 42 to fill via holes 39, 40 such that each of the strain-sensing parts 33 is connected to the corresponding routing circuit 37, 38.

7 Claims, 5 Drawing Sheets

(58) Field of Classification Search
USPC .............................................. 73/767; 72/767
See application file for complete search history.

(56) References Cited

U.S. PATENT DOCUMENTS

| | | | |
|---|---|---|---|
| 2003/0128181 A1* | 7/2003 | Poole ................... | G06F 1/1616 345/156 |
| 2008/0233370 A1* | 9/2008 | Nakao ................... | G01L 1/2287 428/210 |
| 2011/0226069 A1* | 9/2011 | Kim ...................... | G01L 1/2293 73/862.045 |
| 2013/0285970 A1* | 10/2013 | Ahn ....................... | G06F 3/044 345/173 |
| 2017/0261387 A1* | 9/2017 | Vosgueritchian ..... | G01L 1/2268 |

FOREIGN PATENT DOCUMENTS

| | | |
|---|---|---|
| JP | H05141907 A | 6/1993 |
| JP | 2001015882 A | 1/2001 |
| JP | 2002198628 A | 7/2002 |
| JP | 2009079976 A | 4/2009 |

OTHER PUBLICATIONS

Decision to Grant a Patent dated Aug. 22, 2017 for the corresponding Japanese Patent Application No. 2015-234431.

* cited by examiner

MULTIPOINT-MEASUREMENT STRAIN SENSOR AND METHOD FOR PRODUCING THE SAME

TECHNICAL FIELD

The present invention relates to a multipoint-measurement strain sensor and a method for producing the same.

BACKGROUND ART

Tasks concerning the problem of the aging of the social infrastructures developed in the high growth period are to adopt appropriate maintenance schemes to achieve longer life and to reduce and level the total cost of maintenance and renewal. To accomplish the tasks, it is expected to promote the development of monitoring technology that makes it possible to efficiently grasp the states of social infrastructures by utilizing sensors, IT, and the like.

The measurement modes of the monitoring technology include a fixed type for constant monitoring and a mobile type for regular monitoring. For the fixed type, sensors, cameras, or the like are installed in a structure (a concrete structure, a steel structure, an earth structure, a ground, or the like). For the mobile type, a movable body (a vehicle or the like) on which a sensor, a camera, or the like is installed is used. The currently predominant measurement mode is the fixed type. A typical example of the fixed type may include monitoring the secular change in the amount of strain with a strain sensor installed on a concrete structure (a tunnel wall surface, a road surface, or the like) and a steel structure (a bridge or the like).

As a strain sensor used for such a fixed monitoring technique, for example, JP-A-2009-79976 discloses a sensor that measures, at multiple points, strains of a road surface on which traveling wheels of a moving object are in contact. Specifically, in this strain sensor 1 that enables multipoint measurement, a gauge base 4, to which a plurality of resistance type strain gauges 3 is laminated, is laminated onto the back surface of a flexible substrate 2. Further, a sheet-shaped insulating member (cover film) 5 is laminated onto the surface of the flexible substrate 2, thereby providing a sensor structure part 6 (see FIGS. 13 and 14). A thin film conductor (routing circuit) 18 and thin film conductors (routing circuits) 19, 20 are provided on the flexible substrate 2. The thin film conductor (routing circuit) 18 conducts to a lead connection part 14a of lead connection parts (tabs) 14a, 14b at both ends of a strain-sensing part 13 of each resistance type strain gauge 3. The thin film conductors (routing circuits) 19, 20 conduct to the lead connection part 14b. A gauge base 4 of the sensor part 6 is installed on the road surface in such a way that the strain gauge 3 is located in the area of the road surface that the wheels contact, and ends 18b, 19b, 20b of the thin film conductors 18, 19, 20 are located in an area where the ends deviate from the contact area in the width direction of the wheels.

Various embodiments are disclosed in JP-A-2009-79976. For example, the flexible substrate 2 shown in FIGS. 13 and 14 has a two-layer structure composed of a first layer substrate 7 and a second layer substrate 8. Alternatively, a single layer flexible substrate may be used. Further, in FIG. 14, a plurality of strain gauges 3 having a gauge base 12 and a strain-sensing part 13 are used. Furthermore, these strain gauges 3 are laminated onto the surface of the gauge base 4. Alternatively, a plurality of strain-sensing parts 13 may be directly formed on the surface of the gauge base 4 by photo etching or the like. Further, in FIGS. 13 and 14, gauge leads 15a, 15b are respectively connected to the tabs 14a, 14b at both ends of each strain-sensing part 13. Thus, conduction between the tab 14a and the thin film conductor 18 and conduction between the tab 14b and the thin film conductors 19, 20 are carried out via the gauge leads 15a, 15b. Alternatively, it is also possible to provide conduction between the tab 14a and the thin film conductor 18 and conduction between the tab 14b and the thin film conductors 19, 20 without using the gauge leads 15a, 15b.

SUMMARY OF THE INVENTION

Problems to be Solved by the Invention

However, slippage occurs in the strain sensor described in JP-A-2009-79976 at the time when the gauge base 4 having a plurality of strain-sensing parts 13 is laminated onto the flexible substrate 2 provided with the thin film conductors (routing circuits) 18, 19, 20 that correspond to the respective strain-sensing parts 13. This raises a problem that a conduction failure occurs between the lead connection parts 14a, 14b at both ends of the strain-sensing part 13 and the thin film conductors (routing circuits) 18, 19, 20 of the flexible substrate 2. In addition, there are many layer structures, which considerably increases the material cost and hence the production cost.

Accordingly, an object of the present invention is to provide a multipoint-measurement strain sensor and a method for producing the same, the sensor being capable of preventing a conduction failure originated from slippage at the time of lamination, and reducing material cost.

Solutions to the Problems

As a means for solving the above-mentioned problem, a first aspect of the present invention provides a multipoint-measurement strain sensor including: a substrate film; a plurality of strain-sensing parts formed on a first main surface of the substrate film; routing circuits formed, in correspondence with the respective strain-sensing parts, on a second main surface of the substrate film, and having outer connection terminals near an outer edge of the substrate film; and a conductive paste to fill via holes such that each of the strain-sensing parts is connected to the corresponding routing circuit.

As described above, a plurality of strain-sensing parts and routing circuits corresponding to the respective strain-sensing parts are provided on different surfaces of the same substrate film. Therefore, it is unnecessary to laminate, for connection, the strain-sensing parts and the routing circuits. Therefore, a conduction failure between the strain-sensing parts and the routing circuits, which is originated from slippage at the time of lamination, does not occur. In addition, the reduction in the number of layers constituting the strain sensor can reduce the material cost and hence the production cost.

A second aspect of the present invention provides the multipoint-measurement strain sensor according to the first aspect, further including: an insulative first cover layer formed on the first main surface of the substrate film so as to cover the strain-sensing parts; an insulative second cover layer formed on the second main surface of the substrate film so as to cover the routing circuits except for the outer connection terminals; and a conductive terminal protection layer formed so as to cover the outer connection terminals of the routing circuits.

The above configuration can prevent deterioration originated from oxidation, sulfurization, or migration (electrolytic corrosion).

A third aspect of the present invention provides the multipoint-measurement strain sensor according to the first aspect or the second aspect, which further includes leads to be mounted on the outer connection terminals of the routing circuits.

A fourth aspect of the present invention provides the multipoint-measurement strain sensor according to any one of the first to third aspects, which further includes an adhesive layer for fixing the sensor, the layer being formed on the first main surface side of the substrate film, wherein the adhesive layer is formed so as to avoid lying over the via holes.

The above configuration relaxes the stress on the via holes and the conductive paste in the via holes at the time of distortion. This can prevent disconnection at this portion.

A fifth aspect of the present invention provides a method for producing a multipoint-measurement strain sensor, the method including the steps of: laminating a first metal layer on a first main surface of a substrate film, and laminating a second metal layer on a second main surface of the substrate film; forming, by etching, a conductive pattern constituting a plurality of strain-sensing parts from the first metal layer, and forming, by etching, a conductive pattern constituting routing circuits corresponding to the respective strain-sensing parts and having outer connection terminals near an outer edge of the substrate film from the second metal layer; forming via holes in the substrate film at positions where the strain-sensing parts face the routing circuits; and filling via holes with a conductive paste.

As described above, a plurality of strain-sensing parts and routing circuits corresponding to the respective strain-sensing parts are provided on different surfaces of the same substrate film. Therefore, it is unnecessary to laminate, for connection, the strain-sensing parts and the routing circuits. Therefore, a conduction failure between the strain-sensing parts and the routing circuits, which is originated from slippage at the time of lamination, does not occur. In addition, the reduction in the number of layers constituting the strain sensor can reduce the material cost and hence the production cost.

A sixth aspect of the present invention provides the method for producing a multipoint-measurement strain sensor according to the fifth aspect, which further includes the steps of forming an insulative first cover layer on the first main surface of the substrate film having the via holes filled with the conductive paste so as to cover the strain-sensing parts, and forming an insulative second cover layer on the second main surface of the substrate film so as to cover the routing circuits except for the outer connection terminals; and forming a conductive terminal protection layer so as to cover the outer connection terminals of the routing circuits.

The above configuration can prevent deterioration originated from oxidation, sulfurization, or migration (electrolytic corrosion).

A seventh aspect of the present invention provides a method for producing a multipoint-measurement strain sensor according to the fifth aspect or the sixth aspect, which further includes the step of mounting a lead on the outer connection terminal of the routing circuit.

Advantageous Effects of the Invention

According to the multipoint-measurement strain sensor and the method for producing the same of the present invention, as described above, a plurality of strain-sensing parts and routing circuits corresponding to the respective strain-sensing parts are provided on different surfaces of the same substrate film. Therefore, it is unnecessary to laminate, for connection, the strain-sensing parts and the routing circuits. Therefore, a conduction failure between the strain-sensing part and the routing circuit, which is originated from slippage at the time of lamination, does not occur. In addition, the reduction in the number of layers constituting the strain sensor can reduce the material cost and hence the production cost.

DESCRIPTION OF EMBODIMENTS

The following describes embodiments of the present invention in more detail with reference to the accompanying drawings. It should be noted that the scope of the present invention is not limited to, unless otherwise specified, the dimensions of, materials for, shapes of, relative positions, and the like of the parts and portions described in examples of the present invention, which are merely illustrative examples.

First Embodiment

<Strain Sensor>

Figure 1:
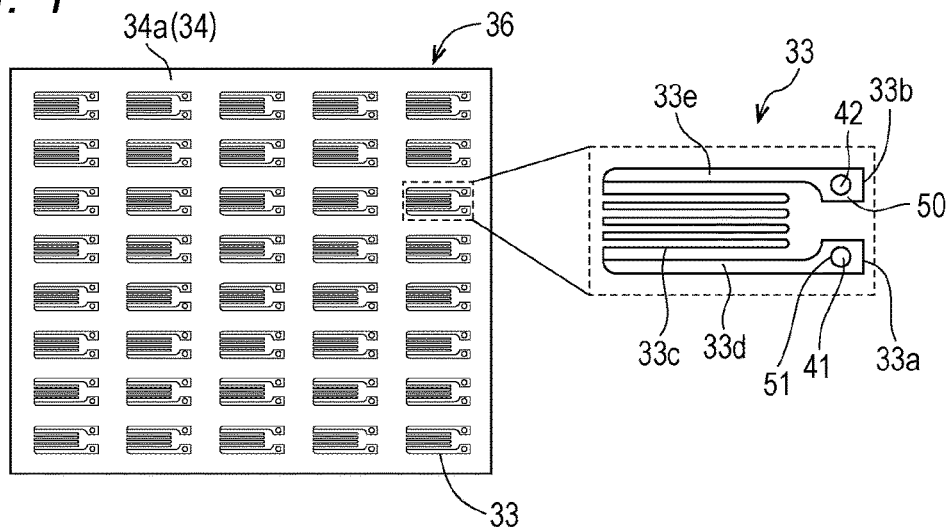
FIG. 1 is a plan view of the sensor structure part of a strain sensor according to a first embodiment of the present invention as seen from the strain-sensing parts side thereof.
Figure 2:
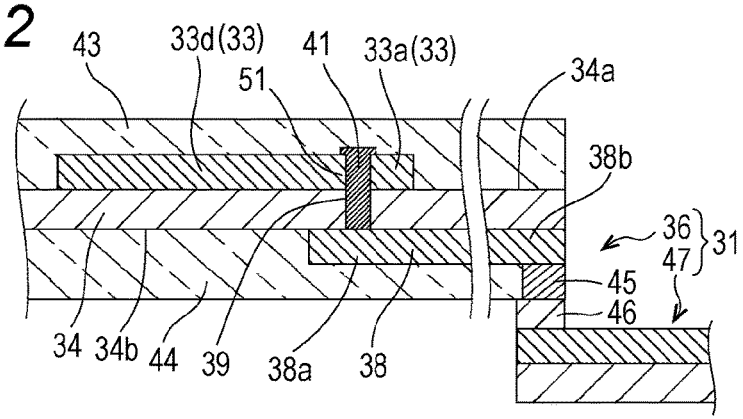
FIG. 2 is a cross-sectional view illustrating the sensor structure part which is illustrated in FIG. 1 and to which leads are attached.
Figure 3:
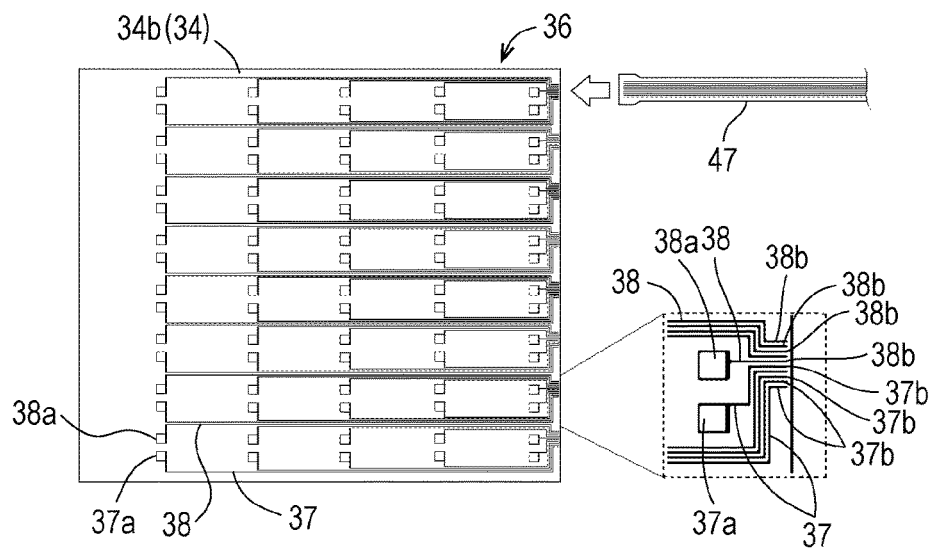
FIG. 3 is a plan view illustrating the sensor structure part illustrated in FIG. 1 as seen from the routing circuit side thereof.

A strain sensor 31 of this embodiment includes a sensor structure part 36. As shown in FIGS. 1 to 3, the sensor structure part 36 includes a substrate film 34 and a plurality of resistance type strain-sensing parts 33 (hereinafter simply referred to as strain-sensing parts 33) formed on a first main surface of the substrate film 34, routing circuits 37, 38, and conductive pastes 41, 42. The routing circuits 37, 38 are formed on a second main surface of the substrate film 34 in correspondence with the respective strain-sensing parts 33. The routing circuits 37, 38 have outer connection terminals 37b, 38b near the outer edge of the substrate film 34. The conductive pastes 41, 42 are filled in via holes 39, 40 to connect the strain-sensing parts 33 and the routing circuits 37, 38 corresponding thereto. The entire sensor structure part 36 is formed in a thin square plate shape. Furthermore, the side of the sensor structure part 36 which is on the strain-sensing parts 33 side of the substrate film 34 is brought into close contact with the structure. In FIG. 2, for the sake of convenience of illustration and explanation, the sensor structure part 36 is illustrated thick.

The substrate film 34 is made of an insulating material and has flexibility. This insulating material includes polyester (PET), polyimide amide (AI), polyphenylene sulfide (PPS), polyether ether ketone (PEEK), polyimide (PI), polytetrafluoroethylene (PTFE), and the like. The thickness of the substrate film 34 is appropriately selected according to the application of the strain sensor 31. Specifically, the substrate film 34 having a thickness of 1 µm to 300 µm can be adopted. This is because when the thickness exceeds the upper limit, the strain sensitivity decreases, and when the thickness exceeds the lower limit, destruction is likely to occur under strain.

As shown in FIGS. 1 and 2, a plurality of strain-sensing parts 33 is provided on the first main surface 34a of the substrate film 34. The strain-sensing part 33 is arranged in a grid pattern of 8 rows×5 columns in a plan view. Further, the length directions (axial directions) of the strain-sensing parts 33 extend along the same direction.

The amount of strain of an object to be measured is measured by using the phenomenon such that the stretching of the metal constituting a main body 33c of each strain-sensing part 33 increases the resistance value of the strain sensor 31 whereas compressing the metal decreases the resistance value. The resistance value of the metal increases because the stretching of a metal decreases the cross-sectional area of the metal and elongates the metal. On the other hand, the resistance value of the metal decreases because the stretching of the metal increases the cross-sectional area of the metal and shortens the metal.

As can be seen from the partly enlarged view of FIG. 1, the main body 33c of the strain-sensing part 33 is a single resistor, ends of a plurality of strip-like portions arranged in parallel at given intervals are connected at a connecting portion extending in a width direction. That is, the main body 33c of the strain-sensing part 33 has a zigzag shape in which one strip-like body is folded multiple times at given intervals. First land portions 33a, 33b are connected to both ends of the bent main body 33c by wirings 33d, 33e. The width of the main body 33c of the strain-sensing part 33 is preferably small so that the change rate of the resistance value can be easily detected. On the other hand, the width of the wiring 33d of the strain-sensing part 33 is preferably large so that the ratio of the resistance value of the wiring 33d to the resistance value of the whole strain-sensing part 33 is small.

The material of each strain-sensing part 33 is not particularly limited as long as the main body 33c functions as a resistor. Examples of the material for each strain-sensing part 33 may include platinum, aluminum, nickel, tungsten, iron, gold, silver, copper, palladium, chromium, a copper nickel alloy, a nickel chromium alloy, a copper manganese alloy, an iron chrome alloy, and the like. In particular, the copper nickel alloy, nickel chromium alloy, copper manganese alloy and iron chrome alloy are preferable in consideration of resistance value, linear expansion coefficient, and the like. Also, in the present invention, as shown in FIGS. 1 and 2, each of the strain-sensing parts 33 is formed directly on the substrate film 34. The strain-sensing part 33 can be formed by patterning a film made of the above-mentioned material by an etching method. The thickness of each strain-sensing part 33 is preferably 0.1 µm to 100 µm. This is because when the thickness exceeds the upper limit, the strain sensitivity decreases, and when the thickness exceeds the lower limit, destruction is likely to occur under strain.

The first land portions 33a, 33b of the strain-sensing part 33 shown in FIG. 1 are substantially rectangular, and land holes 50, 51 are formed in the center portion thereof. The diameters of the first land portions 33a, 33b may be set to, for example, 100 µm to 1000 µm. The shape of the first land portions 33a, 33b should not be limited to the above shape, and may be circular.

As shown in FIGS. 2 and 3, a plurality of routing circuits 37, 38 is provided on the second main surface 34b of the substrate film 34 (the surface opposite to the surface on which the strain-sensing parts 33 are formed).

The respective numbers of these routing circuits 37, 38 is the same as the number of strain-sensing parts 33. One routing circuit 37, 38 is associated with each strain-sensing part 33. In addition, although copper (Cu), silver (Ag), gold (Au), aluminum (Al), or the like may be used as a material for these routing circuits 37, 38, a conductor having a specific resistance sufficiently lower than that of strain-sensing parts 33 is selected as appropriate. Also, in the present invention, as shown in FIGS. 2 and 3, each of the routing circuits 37, 38 is formed directly on the substrate film 34. The routing circuits 37, 38 may be formed by patterning a film made of the above-mentioned material by etching. The thickness of each routing circuit 37, 38 is preferably 0.1 µm to 100 µm. This is because when the thickness exceeds the upper limit, the strain sensitivity decreases, and when the thickness exceeds the lower limit, destruction is likely to occur under strain.

Each of the routing circuits 37, 38 has a second land portion 37a, 38a at one end thereof. The second land portions 37a, 38a are provided on opposite sides of the first land portions 33a, 33b with the substrate film 34 interposed therebetween. For example, the second land portions 37a, 38a are formed in a rectangular shape as shown in FIG. 3. The width of the second land portions 37a, 38a may be set to 100 µm to 1000 µm. The shape of the second land portions 37a, 38a should not be limited to a rectangle, but may be a circle.

Connections of the respective strain-sensing parts 33 and the respective routing circuits 37, 38 by the conductive pastes 41, 42 will be described.

Via holes 39, 40 are formed in the substrate film 34. The via holes 39, 40 overlap land holes 50, 51 of the first land portions 33a, 33b and penetrate to the second land portions 37a, 38a (see FIGS. 1 to 3). The bottom surfaces of the via holes 39, 40 correspond to the inner surfaces of the second land portions 37a, 38a. The openings of the via holes 39, 40 may be formed, for example, by laser irradiation, substrate film etching, or the like. The diameter of the via holes 39, 40 may be set to, for example, 20 µm to 300 µm.

The conductive pastes 41, 42 fill the via holes 39, 40 so as to cover the entire bottom surfaces of the via holes 39, 40. In addition, the conductive pastes 41, 42 cover at least the entire inner walls of the land holes 50, 51 of the first land portions 33a, 33b. The bottom portions of the conductive pastes 41, 42 are in contact with the second land portions 37a, 38a. The upper portions of the conductive pastes 41, 42 are in contact with the first land portions 33a, 33b.

The conductive pastes 41, 42 generally include conductive particles and a binder resin. The binder resin is a thermosetting resin, and exists as a cured substance after filling. The conductive particles contained in the conductive paste may be formed from silver, copper, nickel, or the like.

More preferably, a material that follows the stretching/contraction of the strain-sensing part 33 is used for the conductive pastes 41, 42. This is because a disconnection occurs under strain if the material does not follow the stretching/contraction. Regarding this material that follows the stretching/contraction, for example, an urethane resin and silicone resin may be used as the thermosetting resin.

As a method of filling the conductive pastes 41, 42 into the via holes 39, 40, printing methods such as screen printing and ink jetting may be used. After the filling, the binder resin is cured by drying such as thermal drying or flash lamp annealing.

The other ends (outer connection terminals), 37b, 38b, of the routing circuits 37, 38 are provided near one side of the substrate film 34. Each of the routing circuits 37, 38 is provided so as to extend on the second main surface of the substrate film 34 between both ends 37a and 37b or between both ends 38a and 38b. More specifically, as shown in FIG. 3, the routing circuits 37, 38 are mainly arranged so as to extend along the length direction of the plurality of strip-like portions in the main body 33c of each strain-sensing part 33. The other ends (outer connection terminals) 37b, 38b of the routing circuits 37, 38 are arranged so as to be aggregated in several bundles in the longitudinal direction of the substrate film 34 (vertical direction in FIG. 3). Of course, all the other ends may be aggregated into one bundle.

In this embodiment, the routing circuits 37, 38 are conducted one by one at both ends of each strain-sensing part 33, through the conductive pastes 41, 42 filled in the via holes 39, 40. In the case of compensating for the influence of the temperature by the three wire system, two routing circuits may be conducted to one of both ends of each strain-sensing part 33 (not shown).

In the sensor structure part 36 as described above, a plurality of strain-sensing parts and a routing circuit corresponding to each strain-sensing part are provided on the same substrate film. Therefore, it is unnecessary to laminate, for connection, the strain-sensing part and the routing circuit. Therefore, a conduction failure between the strain-sensing part and the routing circuit, which is originated from slippage at the time of lamination, does not occur.

In addition, since the number of layers constituting the strain sensor can be reduced, the material cost and hence the production cost can be reduced.

Further, the above-described sensor structure part 36 may further include other layers.

For example, from the viewpoint of preventing deterioration originated from oxidation, sulfurization, or migration (electrolytic corrosion), each strain-sensing part 33 may be covered with an insulative first cover layer 43 as shown in FIG. 2. Likewise, from the viewpoint of preventing deterioration originated from oxidation, sulfurization, or migration, as shown in FIG. 2, each of the routing circuits 37, 38, except for the outer connection terminals 37b, 38b, may be covered with an insulative second cover layer 44. As a method of forming the first cover layer 43 and the second cover layer 44, lamination of cover films such as a lamination or thermal pressing, and a printing method such as screen printing may be used.

When a cover film is laminated as a method of forming the first cover layer 43 and the second cover layer 44, the same material as the one for the substrate film 34 can be adopted for the cover film. Printing as a method of forming the first cover layer 43 and the second cover layer 44 may include applying a thermosetting resin such as urethane resin, polyamide resin, acrylic resin, and polyimide resin to a predetermined thickness, and curing the resin, for example.

A terminal protection layer 45 may be formed so as to cover the other ends (outer connection terminals) 37b, 38b of the respective routing circuits 37, 38. As a method of forming the terminal protection layer 45, nickel base gold plating, solder plating, and the like may be used.

The above has described the structure of the sensor structure part 36.

Leads 47 of an FPC (Flexible Printed Circuit) or the like, which is connected to a measuring instrument directly or via the terminal protection layer 45, are mounted on the outer connection terminals 37b, 38b of the routing circuit.

In the FPC, in general, a plurality of wiring patterns is formed from a gold-plated copper foil on a substrate film made of polyimide. Furthermore, the portions of each wiring pattern, which do not need to be exposed, are coverable with a coverlay made of polyimide.

As a method of mounting the lead 47, for example, when the lead 47 is an FPC, thermocompression bonding using a conductive adhesive material or the like may be used. This conductive adhesive materials include an anisotropic conductive film (ACF), an anisotropic conductive adhesive (ACA) 46, and the like.

The terminal protection layer 45 is provided from the viewpoint of prevention of deterioration originated from oxidation, sulfurization, or migration of the outer connection terminals 37b, 38b of the routing circuit. The terminal protection layer 45 is electrically conductive so that the outer connection terminals 37b, 38b and the lead 47 can be electrically connected. As the material for the terminal protection layer 45, for example, Ni underlying Au plating, solder plating, and the like may be used. Plating is used for forming the terminal protection layer 45 made of Ni base Au plating or solder plating. Plating is also used to form the Ni layer, which is the base of Au plating.

In the case of measuring the strain of a structure, for example, a concrete structure of a tunnel, a steel structure of a bridge, or the like, using the strain sensor 31 of the present embodiment, the surface of both surfaces of the substrate film 34 of the sensor structure part 36, which is located on the strain-sensing part 33 side, is made to face the structure and the sensor structure part 36 is tightly adhered to the structure by an adhesive interposed between the sensor structure part 36 and the structure.

Since the leads 47 are taken out from the surface of the sensor structure part 36, opposite to the surface which is in close contact with the structure, the leads do not hinder the close contact between the sensor structure part 36 and the structure. That is, when the leads 47 are taken out from the surface of the sensor structure part 36, which is in close contact with the structure (that is, the surface having the plurality of strain-sensing parts 33), due to the thickness of the crimped portion of the leads 47, undulations are formed on the surface of the sensor structure part 36, the surface being adhered to the structure. Therefore, the adhesion force tends to decrease. Further, when the leads 47 are pulled or the like, the sensor structure part 36 is liable to roll from the structure. As a result, the measurement accuracy of the strain sensor drops.

Figure 12:
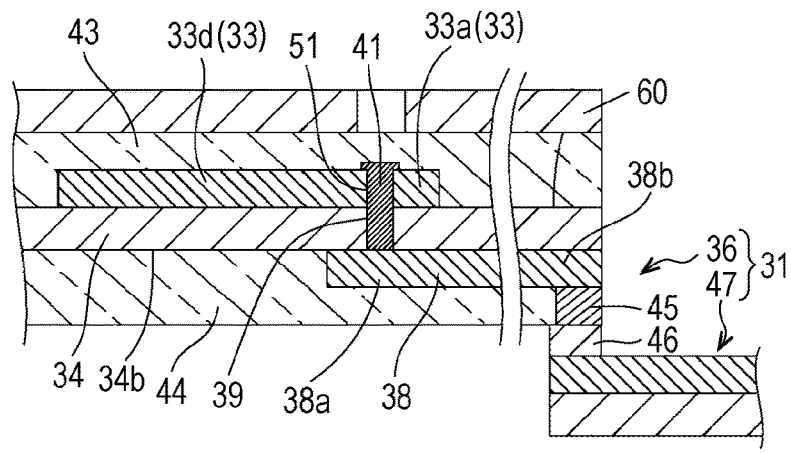
FIG. 12 is a cross-sectional view of a strain sensor including an adhesive layer.
Figure 13:
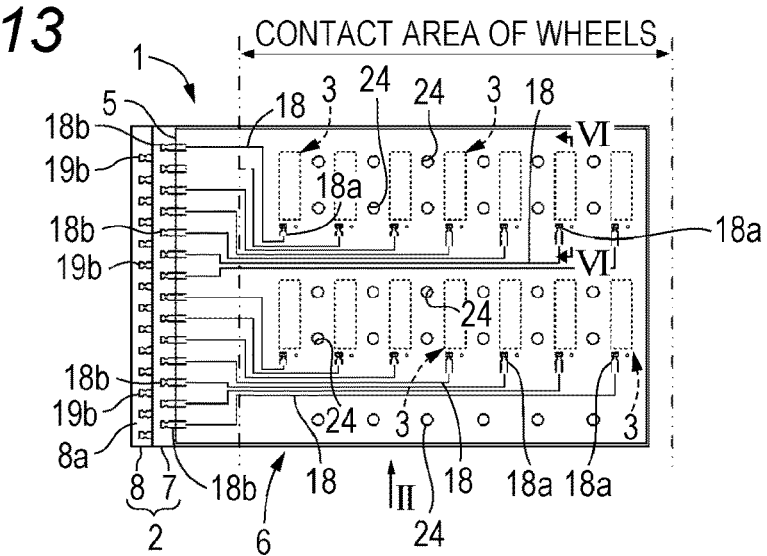
FIG. 13 is a plan view illustrating an example of the sensor structure part of a strain sensor according to the related art.
Figure 14:
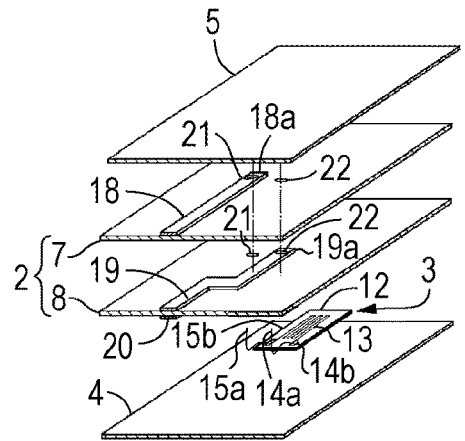
FIG. 14 is an exploded perspective view of a part of the sensor structure part illustrated in FIG. 13.

Instead of applying the adhesive to the strain sensor 31 when it is fixed to the structure, an adhesive layer 60 for fixing the sensor may be provided in advance on the surface on the strain-sensing part 33 side (see FIG. 12). In this case, the adhesive layer 60 is preferably formed so as to avoid lying over the via holes 39, 40. The adhesive layer 60 is preferably formed to have, for example, an opening portion that surrounds each via hole 39, 40 or a strip-like non-formed portion so as to avoid lying over a row in which a plurality of via holes 39, 40 is arranged. This is because the stress on the via holes 39, 40 and the stress on the conductive pastes 41, 42 at the time of distortion are relieved, so that disconnection at this portion can be prevented. The material for the adhesive layer 60 may be appropriately selected according to the material for the structure to be measured.

The following describes, in detail, a method of providing a strain sensor having the above configuration.

<Method for Producing a Strain Sensor>

A method for producing a multipoint-measurement strain sensor of the present embodiment is characterized in that the method includes the steps of:

(1) laminating a first metal layer on a first main surface of a substrate film, and laminating a second metal layer on a second main surface of the substrate film;

(2) forming, by etching, a conductive pattern constituting a plurality of strain-sensing parts from the first metal layer, and forming, by etching, a conductive pattern constituting routing circuits corresponding to the respective strain-sensing parts and having outer connection terminals near an outer edge of the substrate film from the second metal layer;

(3) forming via holes in the substrate film at positions where the strain-sensing parts face the routing circuits; and (4) filling via holes with a conductive paste.

To prevent deterioration originated from oxidation, sulfurization, or migration, the method for producing a multipoint-measurement strain sensor according to the present invention may further include the steps of:

(5) forming an insulative first cover layer on the first main surface of the substrate film having the via holes filled with the conductive paste so as to cover the strain-sensing parts, and forming an insulative second cover layer on the second main surface of the substrate film so as to cover the routing circuits except for the outer connection terminals; and (6) forming a conductive terminal protection layer so as to cover the outer connection terminals of the routing circuits.

The method for producing a multipoint-measurement strain sensor according to the present invention may further include, after the steps (1) to (4) or the steps (1) to (6), the step of:

(7) mounting leads on the outer connection terminals of the routing circuits.

(1. Lamination Step)

Figure 4:
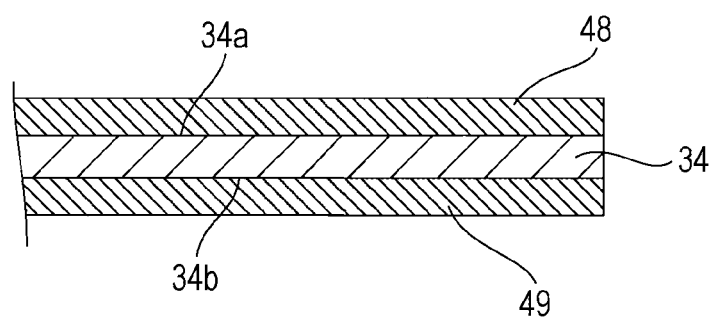
FIG. 4 is a cross-sectional view illustrating a lamination step of the strain sensor according to the first embodiment of the present invention.

The lamination step is to laminate the first metal layer 48 on the first main surface 34*a* of the substrate film 34 and laminate the second metal layer 49 on the second main surface 34*b* of the substrate film 34 (see FIG. 4).

The substrate film 34 has a single-sheet or an elongated shape, and supports the first metal layer 48 and the second metal layer 49. As a material for the substrate film 34, for example, films made of insulating material such as polyester (PEs), polyimide amide (PAI), polyphenylene sulfide (PPS), polyether ether ketone (PEEK), polyimide (PI), polytetrafluoroethylene (PTFE) may be used. The thickness of the substrate film 34 to be used may be 1 μm to 100 μm.

The first metal layer 48 is a layer for forming the strain-sensing part 33. The material of the first metal layer 48 is not particularly limited as long as the main body 33*c* of the strain-sensing part 33 functions as a resistor. As a material for the first metal layer 48, for example, platinum, aluminum, nickel, tungsten, iron, gold, silver, copper, palladium, chromium, a copper nickel alloy, a nickel chromium alloy, a copper manganese alloy, an iron chrome alloy, and the like may be used. In particular, the copper nickel alloy, nickel chromium alloy, copper manganese alloy and iron chrome alloy are preferable in consideration of the resistance value, linear expansion coefficient, and the like.

The method of forming the first metal layer 48 is not particularly limited. The first metal layer 48 may be formed by, for example, lamination of a metal foil by hot pressing, vacuum deposition, sputtering, ion plating, plating, or the like.

The second metal layer 49 is a layer for forming the routing circuits 37, 38. The material for the second metal layer 49 is a conductor having a specific resistance sufficiently lower than that of the first metal layer 48, such as copper (Cu), silver (Ag), gold (Au), and aluminum (Al).

The method of forming the second metal layer 49 is not particularly limited. Like the first metal layer 48, the second metal layer 49 may be formed by, for example, lamination of a metal foil by hot pressing, vacuum deposition, sputtering, ion plating, plating, or the like.

(2. Patterning Step)

Figure 5:
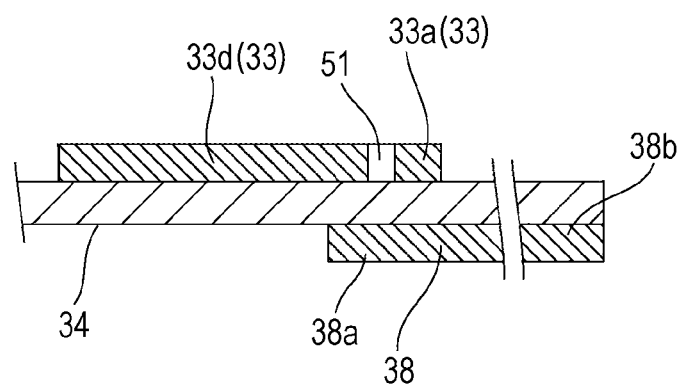
FIG. 5 is a cross-sectional view illustrating a patterning step of the strain sensor according to the first embodiment of the present invention.

The patterning step is to form, by etching, the conductive patterns of the strain-sensing parts 33 and the respective routing circuits 37, 38, from the above-mentioned first metal layer 48 and second metal layer 49 (see FIG. 5).

For example, a resist film having a shape corresponding to the conductive pattern to be formed is laminated on the surfaces of the above-mentioned first metal layer 48 and second metal layer 49. Each of the conductive patterns is formed by immersing the laminate in an etching solution. Then, all of the resist films remaining on the patterned first metal layer 48 and second metal layer 49 are stripped off with a resist stripping solution. As a result, the entire surfaces of the first metal layer 48 and the second metal layer 49 are exposed.

Through the above steps, the substrate film 34 including a plurality of strain-sensing parts 33 and the routing circuits 37, 38 is provided. The plurality of strain-sensing parts 33 are formed on the first main surface 34*a* of the substrate film 34. The routing circuits 37, 38 are formed on the second main surface 34*b* of the substrate film 34 in correspondence with the respective strain-sensing parts 33. Further, the routing circuits 37, 38 have outer connection terminals 37*b*, 38*b* near the outer edge of the substrate film 34.

In the case where the substrate film 34 is long, two or more sensor structure parts 36 are formed continually.

In order to form the resist film such that the resist film has a shape corresponding to the conductive pattern, for example, the following method is used. A composition of a photosensitive resin such as a dry film resist and a liquid resist is applied. The photosensitive resin film is exposed to have a predetermined shape by irradiation with an electron beam or light (ultraviolet light) through a mask. Then, unnecessary portions are dissolved and removed by contact with a developing solution. The photosensitive resin includes a negative type in which the exposed portion becomes insoluble in the developing solution, and a positive type in which the exposed portion becomes soluble in the developing solution.

In order to form the resist film into a shape corresponding to the conductive pattern, a printing method such as screen printing may also be used.

(3. Via Forming Step)

Figure 6:
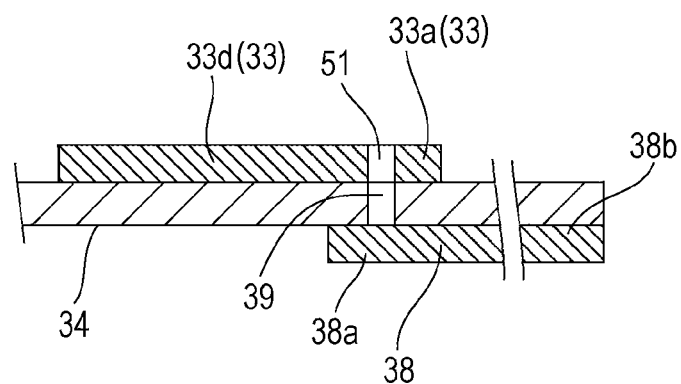
FIG. 6 is a cross-sectional view illustrating a via-hole forming step of the strain sensor according to the first embodiment of the present invention.

The via forming step is to form the via holes 39, 40 for both-sides conduction of the strain-sensing parts 33 and the routing circuits 37, 38 (see FIG. 6).

The via holes 39, 40 overlap with the land holes 50, 51 provided in the first land portions 33a, 33b, which are both ends of each strain-sensing part 33. Further, the via holes 39, 40 pass through the substrate film 34 to reach the inner surface (the surface on the substrate film 34 side) of the routing circuits 37, 38. The openings of the via holes 39, 40 may be formed, for example, by laser irradiation using a UV-YAG laser, a carbon dioxide gas laser, an excimer laser, or the like, or by substrate film etching or the like.

(4. Via Filling Step)

Figure 7:
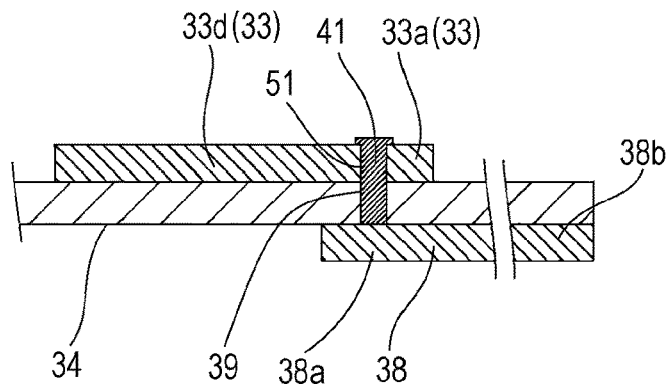
FIG. 7 is a cross-sectional view illustrating a via filling step of the strain sensor according to the first embodiment of the present invention.

The via filling step is to fill the above-mentioned via holes 39, 40 with the conductive pastes 41, 42 (see FIG. 7). Through the above steps, the bottom portions of the conductive pastes 41, 42 contact the second land portions 37a, 38a of the routing circuits 37, 38. Further, the upper portions of the conductive pastes 41, 42 are in contact with the first land portions 33a, 33b of the strain-sensing parts 33. As a result, the both-sides conduction of the strain-sensing parts 33 and the routing circuits 37, 38 is achieved.

The conductive pastes 41, 42 generally include conductive particles and a binder resin. The binder resin is a thermosetting resin, and exists as a cured substance after filling. The conductive particles contained in the conductive paste may be formed from silver, copper, nickel, or the like.

As a method of filling the conductive pastes 41, 42 into the via holes 39, 40, printing methods such as screen printing and ink jetting may be used. After the filling, the binder resin is cured by drying such as thermal drying or flash lamp annealing.

(5. Cover-Layer Forming Step)

Figure 8:
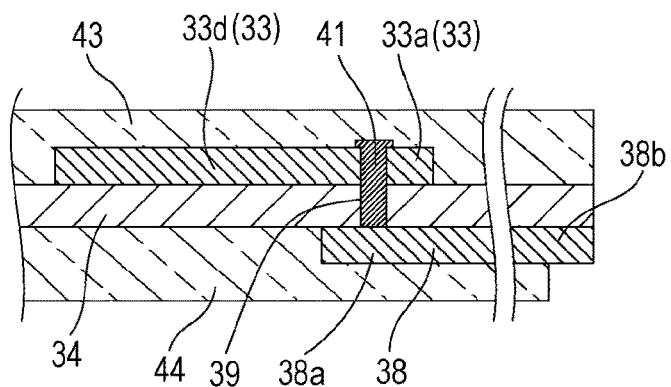
FIG. 8 is a cross-sectional view illustrating a cover-layer forming step of the strain sensor according to the first embodiment of the present invention.

In the cover layer forming step, the strain-sensing part 33 after the both-sides conduction is covered with the insulative first cover layer 43 and the respective routing circuits 37, 38, except for the outer connection terminals 37b, 38b, are covered with the insulative second cover layer 44 (see FIG. 8).

As a method of forming the first cover layer 43 and the second cover layer 44, lamination of a cover film with a laminator, thermal pressing, or the like, and printing such as screen printing may be used.

When a cover film is laminated as a method of forming the first cover layer 43 and the second cover layer 44, the same material as the one for the substrate film 34 may be adopted for the cover film. Printing as a method of forming the first cover layer 43 and the second cover layer 44 may include applying a thermosetting resin such as urethane resin, polyamide resin, acrylic resin, and polyimide resin to a predetermined thickness, and curing the resin, for example.

Through the above steps, it is possible to protect the strain-sensing parts 33 and the routing circuits 37, 38 except for the outer connection terminals 37b, 38b from deterioration originated from oxidation, sulfurization, or migration.

(6. Step of Forming a Protection Layer of Lead Connection Terminals)

Figure 9:
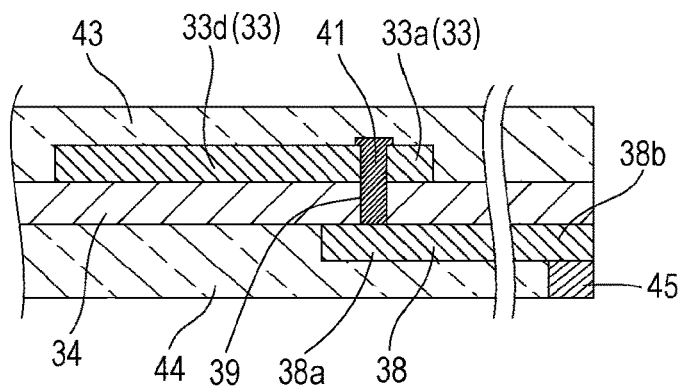
FIG. 9 is a cross-sectional view illustrating a terminal-protection-layer forming step of the strain sensor according to the first embodiment of the present invention.

The step of forming the protection layer of the lead connection terminals is to cover, with the material capable of being conducted to the lead wires, the other ends (outer connection terminals) 37b, 38b of the routing circuits 37, 38, that is, the parts exposed without being covered with the second cover layer 44, thereby protecting the other ends from being deteriorated by oxidation, sulfidation, or migration (see FIG. 9).

As a method of forming the terminal protection layer 45, nickel base gold plating, solder plating, and the like may be used.

Figure 10:
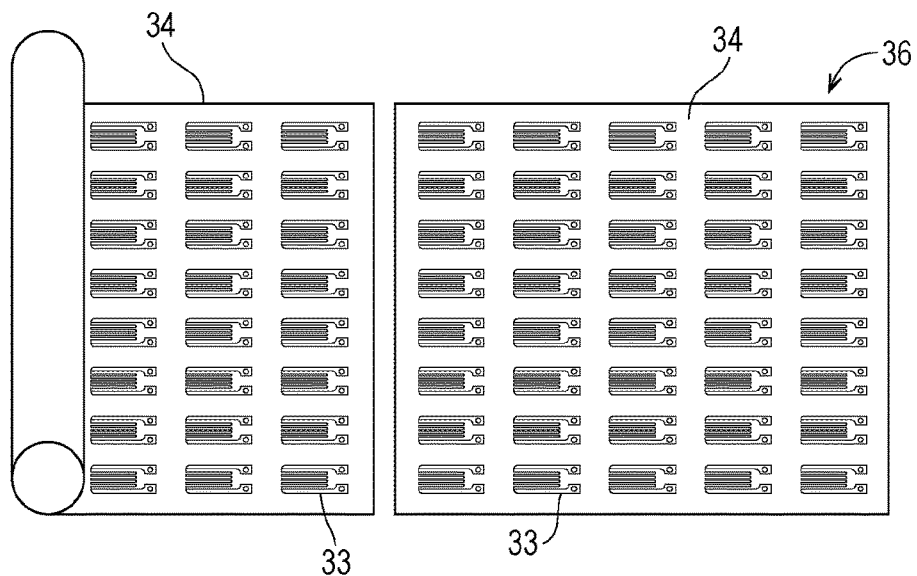
FIG. 10 is a cross-sectional view illustrating an outline processing step of the strain sensor according to the first embodiment of the present invention.

When the substrate film 34 is long, conductive patterns constituting two or more sensor structure parts 36 are formed continually. Thus, an outline processing is further performed to separate the conductive pattern into individual sensor structure parts 36 (see FIG. 10).

As a method of performing outline processing, punching press, laser cutting, and the like may be used.

(7. Lead Mounting Step)

The lead mounting step is, with regard to the sensor structure parts 36, to mount the leads 47 on the outer connection terminals 37b, 38b of the routing circuits 37, 38 via the terminal protection layer 45 (see FIGS. 2 and 3).

As a method of mounting the lead 47, for example, when the lead 47 is an FPC, thermocompression bonding using a conductive adhesive material or the like may be used. The conductive adhesive materials include an anisotropic conductive film, an anisotropic conductive adhesive 46, and the like.

It should be noted that the step of forming the terminal protection layer 45 may be omitted. Alternatively, the leads 47 may be mounted directly on the outer connection terminals 37b, 38b In the strain sensor provided by such a method for producing a strain sensor, a plurality of strain-sensing parts and routing circuits corresponding to the respective strain-sensing parts are provided on the same surface of the same substrate film. Therefore, the lamination step is unnecessary for connection between the strain-sensing parts and the routing circuits. Accordingly, a conduction failure between the strain-sensing parts and the routing circuits, which is caused by slippage at the time of lamination, does not occur.

In particular, in the step of patterning conductive patterns on both sides of the substrate film, in the case of exposing and developing the photosensitive resin in order to form a resist film by etching, the accuracy of the alignment between the strain-sensing parts and the routing circuit is improved.

In addition, since the number of layers constituting the strain sensor can be reduced, the material cost and hence the production cost can be reduced.

Second Embodiment

This embodiment is the same as the first embodiment except that the directions of formation of the routing circuits 37, 38 are different. Therefore, the description of common portions is omitted.

Figure 11:
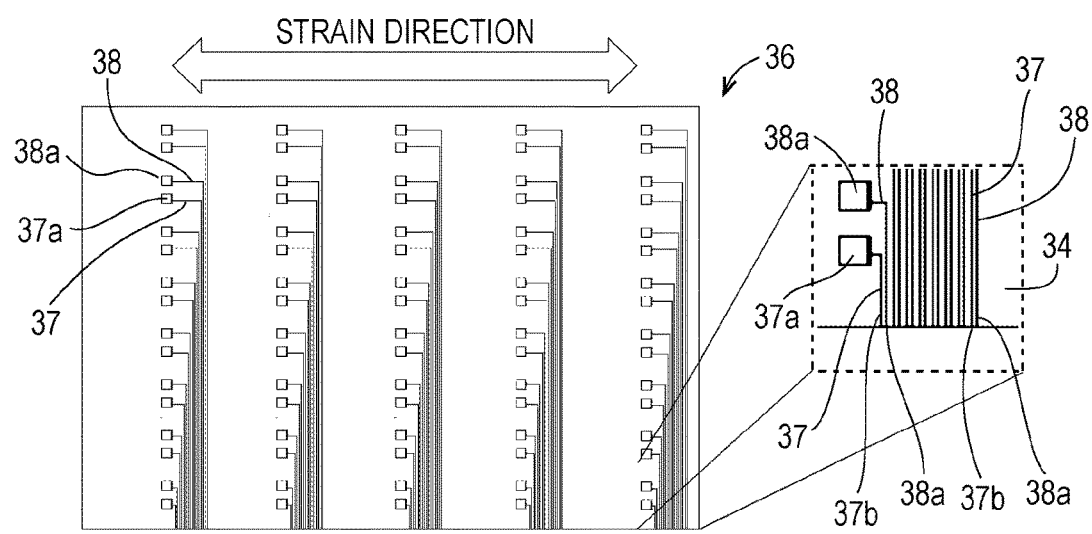
FIG. 11 is a plan view illustrating another example of forming a routing circuit (a second embodiment).

That is, as shown in FIG. 11, the routing circuits 37, 38 of the present invention according to the present embodiment are provided so as to extend along the width direction of the plurality of strip-like portions in the main body 33c of each strain-sensing par 33. In this case, the routing circuits 37, 38 do not inhibit stretching/contraction in the length direction of the metal constituting the strip-like portions of each strain-sensing part 33. Therefore, more accurate strain measurement can be performed.

Other Embodiments

The embodiments disclosed herein are examples in every respect and should not be construed as limitative. The scope of the present invention is not limited to the configurations of the above embodiments. It is intended that the scope of the present invention should be specified by the claims and include all modifications within the spirit and scope of equivalents to the claims.

In the sensor structure part 36 constituting the strain sensor 31 of the above embodiments, as shown in FIG. 1, all the strain-sensing parts 33 are arranged so that the aforementioned sensing directions are aligned in one direction. However, the layout of the strain-sensing parts 33 is not limited to this arrangement. For example, the strain-sensing parts 33 may be mixed so as to face two orthogonal directions, or further may be mixed so as to face the orthogonal directions and the direction of 45 degrees (not shown). Making the directions of the plurality of strain-sensing parts 33 different from each other makes it possible to measure the amounts of strain in an object to be measured in a plurality of directions.

In the strain sensor 31 of the above embodiments, the sensor structure part 36 is connected to an external measuring instrument by using the lead wires 47. However, the external connection is not limited to this method. For example, the measured output values may be wirelessly transmitted to the measuring instrument by providing a transmitter in the sensor structure part 36.

DESCRIPTION OF REFERENCE SIGNS 1, 31 Strain sensor
2 Flexible substrate
3 Strain gauge
4 Gauge base
5 Cover film
6, 36 Sensor structure part
7 First layer substrate
8 Second layer substrate
13, 33 Strain-sensing part
14a, 14b Tab (lead connection part)
18, 19, 20, 37, 38 Routing circuit
22 Through hole
23 Solder (conductive member)
33a, 33b First land portion
33c Main body
33d, 33e Wiring
34 Substrate film
34a First main surface
34b Second main surface
37a, 38a Second land portion
37b, 38b Outer connection terminal
39, 40 Via hole
41, 42 Conductive paste
43 First cover layer
44 Second cover layer
45 Terminal protection layer
46 Anisotropic conductive adhesive
47 Lead wire
48 First metal layer
49 Second metal layer
50, 51 Land hole
60 Adhesive layer

The invention claimed is:

1. A multipoint-measurement strain sensor comprising:
a substrate film;
a plurality of strain-sensing parts formed on a first main surface of the substrate film;
routing circuits formed, in correspondence with the respective strain-sensing parts, on a second main surface of the substrate film, and having outer connection terminals near an outer edge of the substrate film;
a conductive paste to fill via holes such that each of the strain-sensing parts is connected to the corresponding routing circuit; and
leads to be mounted on the outer connection terminals of the routing circuits.

2. The multipoint-measurement strain sensor according to claim 1, further comprising:
an adhesive layer for fixing the sensor, the adhesive layer being formed to have an opening portion that surrounds each of the via holes so as to avoid lying over the via holes.

3. The multipoint-measurement strain sensor according to claim 1, further comprising:
an adhesive layer for fixing the sensor, the adhesive layer being formed to have a strip-like non-formed portion where the via holes are aligned so as to avoid lying over the via holes.

4. The multipoint-measurement strain sensor according to claim 1, further comprising:
an insulative first cover layer formed on the first main surface of the substrate film so as to cover the strain-sensing parts;
an insulative second cover layer formed on the second main surface of the substrate film so as to cover the routing circuits except for the outer connection terminals; and
a conductive terminal protection layer formed so as to cover the outer connection terminals of the routing circuits.

5. The multipoint-measurement strain sensor according to claim 1, further comprising
an adhesive layer for fixing a sensor, the layer being formed on the first main surface side of the substrate film, wherein
the adhesive layer is formed so as to avoid lying over the via holes.

6. A method for producing a multipoint-measurement strain sensor, the method comprising the steps of:
laminating a first metal layer on a first main surface of a substrate film, and laminating a second metal layer on a second main surface of the substrate film;
forming, by etching, a conductive pattern constituting a plurality of strain-sensing parts from the first metal layer, and forming, by etching, a conductive pattern constituting routing circuits corresponding to the respective strain-sensing parts and having outer connection terminals near an outer edge of the substrate film from the second metal layer;
forming via holes in the substrate film at positions where the strain-sensing parts face the routing circuits;
filling via holes with a conductive paste; and
mounting leads on the outer connection terminals of the routing circuits.

7. The method for producing a multipoint-measurement strain sensor according to claim 6, further comprising the steps of:
forming an insulative first cover layer on the first main surface of the substrate film having the via holes filled with the conductive paste so as to cover the strain-sensing parts, and forming an insulative second cover layer on the second main surface of the substrate film so as to cover the routing circuits except for the outer connection terminals; and forming a conductive terminal protection layer so as to cover the outer connection terminals of the routing circuits.

* * * * *